United States Patent [19]

Motani et al.

[11] 4,070,257

[45] Jan. 24, 1978

[54] ELECTROLYTIC PROCESS USING NOVEL DIAPHRAGM

[75] Inventors: Kensuke Motani; Shunji Matuura; Ryohei Kataoka, all of Tokuyama, Japan

[73] Assignee: Electrode Corporation, Chardon, Ohio

[21] Appl. No.: 653,397

[22] Filed: Jan. 29, 1976

Related U.S. Application Data

[60] Continuation of Ser. No. 398,465, Sept. 18, 1973, abandoned, which is a division of Ser. No. 170,999, Aug. 11, 1971, abandoned.

[30] Foreign Application Priority Data

Aug. 13, 1970 Japan .................................. 45-70397

[51] Int. Cl.$^2$ ......................... C25B 1/26; C25B 13/06; C25B 13/08

[52] U.S. Cl. ...................................................... 204/98

[58] Field of Search ............... 162/155, 169; 204/59 F, 204/295, 296, 59 R, 98

[56] References Cited

U.S. PATENT DOCUMENTS 3,694,281    9/1972    Leduc ................................. 156/177

*Primary Examiner*—F.C. Edmundson
*Attorney, Agent, or Firm*—Sherman & Shalloway

[57] ABSTRACT

An electrolytic process employing a diaphragm of a size of at least 1 cm in length in at least two directions, the diaphragm comprising a diaphragm base composed of fibers of fibrous structure containing inorganic fibers and a binder containing a fluorine-containing resin, the fluorine-containing resin being present in an amount of 0.5 – 60% by weight based on the weight of the diaphragm.

3 Claims, No Drawings

ELECTROLYTIC PROCESS USING NOVEL DIAPHRAGM

This is a continuation, of Application Ser. No. 398,465, filed Sept. 18, 1973, now abandoned, which is in turn, a divisional of application Ser. No. 170,999 filed Aug. 11, 1971 now abandoned.

This invention relates to an electrolytic process using a novel diaphragm of a size of at least one centimeter in length in at least two directions, which diaphragm is composed of an inorganic fibrous diaphragm base and a fluorine-containing resinous binder.

More particularly, the invention relates to an electrolytic process using a novel diaphragm which comprises inorganic fibers and 0.5 – 60% by weight based on the weight of the diaphragm of a fluorine-containing resinous binder, and a process for making the same.

Various types of diaphragms are known. For example, as the diaphragm for the electrolysis of an alkali salt, asbestos paper containing starch or synthetic rubber latex as the binder, and deposited asbestos on iron wire gauze are the two employed on an industrial scale. However, both types of diaphragm possess low mechanical strength and receive noticeable damage during use. Consequently, they have to be occasionally reinforced or replaced. Furthermore, the diaphragm-mounting operation is very time-consuming and requires high skill. Also, the asbestos diaphragm papered with starch or synthetic rubber latex as the binder shows poor chemical resistance. For example, during the diaphragm electrolysis of common salt, the binder in the asbestos paper diaphragm is attached by sodium hypochlorite, chlorine, and alkali, and loses its binding ability. Electrolysis using a conventional type of diaphragm, moreover, is subject to the deficiency in that the water permeation rate increases during the initial period of operation, and stable operation becomes possible only after a certain period of instability. In the attempt to apply the conventional types of diaphragm to bipolar-filter press-type electrolytic cells, they show the drawbacks that they swell and expand during the operation, and that they are impractical to use with substantially high current density, because of their poor efficiency under such high current density conditions.

On the other hand, as the diaphragm for plating, normally asbestos cloth, nylon cloth, Saran cloth, and the like are conventionally employed. However, none of them is quite satisfactory with respect to mechanical strength, chemical resistance and heat stability, and cannot withstand prolonged use.

Extensive research has been conducted for the purpose of eliminating those deficiencies inherent in conventional electrolytic processes using known types of diaphragms, and as a result, it has been discovered that an electrolytic process free of prior are deficiencies is provided using a diaphragm composed of the inorganic fiber-containing diaphragm base and 0.5 – 60% by weight based on the weight of the diaphragm of a fluorine-containing resinous binder.

Accordingly, therefore, a principal object of the invention is to provide an electrolytic process using diaphragms of high mechanical strength and excellent dimensional stability, which will not be damaged during use or under moist conditions.

Still another object of the invention is to provide such electrolytic processes using diaphragms of high chemical resistance and thermal resistance.

A further object of the invention is to provide such electrolytic processes using diaphragms which exhibit high efficiency also under high current density, the processes involving not only tank-type, but also bipolar-filter press-type electrolytic cells.

Other objects and advantages of the invention will become apparent from the following more detailed description.

As already specified, the above objects of the invention are accomplished by an electrolytic process using a diaphragm of a size of at least one centimeter in length in at least two directions, which is composed of an inorganic fiber-containing diaphragm base and 0.5 – 60% by weight based on the weight of the diaphragm of a fluorine-containing resinous binder.

In the invention, the diaphragm base containing inorganic fiber includes many separate strands of inorganic fibers of mixture of inorganic fibers with organic fibers. Also, the fibrous structure containing inorganic fibers includes such articles as cloth made through paper-making procedures, paper and woven fabrics made of inorganic fibers, or mixtures of inorganic and organic fibers. Such fibers or fibrous structures include asbestos fibers, rock wool; glass fibers; metallic fibers such as beryllium, boron, tungsten fibers; alumina, boron nitride, silicon carbide, alkali titanate fibers; and cloth, paper and woven fabric, etc., made of the foregoing inorganic fibers. The type of inorganic fiber or structure is not particularly limited in the invention.

Among those inorganic fibers and structures thereof, asbestos fibers, rock wool, and cloths and papers prepared therefrom are normally employed with advantage, since they are inexpensive and easily available. The base materials of the diaphragm are also selected in accordance with the intended utility of the diaphragm, as well as by economical considerations. For example, as the diaphragm for electrolysis of an alkali salt, a base material of high alkali resistance; e.g., asbestos, is advantageously used, while the use of a base having low alkali resistance; e.g., glass fiber, is disadvantageous. Similarly, as the diaphragm for plating, those made of glass fibers can be employed with generally satisfactory results.

It is also possible to mix the inorganic fibers with synthetic or natural organic fibers, such as polyolefin, polyvinyl chloride, polyester, polyamide, etc. and cotton, wool, and the like. However, organic fibers alone provide a diaphragm of markedly inferior properties such as chemical resistance and heat stability when compared to those of the diaphragm made of inorganic fibers, and therefore, use of organic fibers alone is substantially impractical.

The "fluorine-containing resin" in this specification signifies resinous or rubbery polymers containing fluorine atoms in their molecules.

The fluorine-containing resins to be used as the binder in accordance with the invention include polymers of compounds which contain at least one fluorine atom in their molecules, as well as an ethylenic double bond, copolymers thereof, copolymers of at least one of such compounds with other compounds having an ethylenic double bond, and fluorinated rubbery or resinous polymers of polyolefins, polyvinyl halides, etc. The fluorine content of the resins is not particularly limited, but normally those containing at least 10% by weight, preferably at least 20% by weight, of fluorine are employed. More specific examples of such resins include known fluorine-containing resinous polymers and copolymers such as polytetrafluoroethylene, tetrafluoroethylenehexafluoropropylene copolymer, polychlorotrifluoroethylene polyvinyl fluoride, polyvinylidene fluoride, etc. Selection of a specific fluorine-containing resin should be effected in each individual case, according to the intended utility of the diaphragm to be produced. For example, polytetrafluoroethylene, tetrafluoroethylene-hexafluoropropylene copolymer, and polychlorotrifluoroethylene exhibit excellent chemical resistance properties; i.e., acid resistance, alkali resistance and oxidation (chlorine) resistance, etc., whereas polyvinyl fluoride and polyvinylidene fluoride are somewhat inferior with respect to chlorine resistance. It is also permissible to concurrently use such fluorine-containing resin with another component; e.g., other synthetic resin such as a polyolefin.

In the present invention, the fluorine-containing resin serves as the binder or filler of the diaphragm base containing inorganic fibers, and not only shows high chemical resistance itself, but exhibits very strong binding effect under the severe conditions to which the diaphragm is exposed.

This invention is completed based on the discovery of such special properties of the fluorine-containing resin. The fluorine-containing resin is used within the range 0.5 – 60% by weight, preferably 5 – 50% by weight, based on the weight of the diaphragm. The fluorine-containing resin content in any individual case can be suitably determined according to the intended utility of the diaphragm. When it is less than 0.5% by weight, the resulting diaphragm will have insufficient mechanical strength and poor dimensional stability during use or under highly moist conditions. On the other hand, if the fluorine-containing resin content exceeds 60% by weight, the diaphragm will show satisfactory mechanical strength and dimensional stability but poor performance and extremely low permeability. Consequently, when the diaphragm is used, for example, in alkali salt electrolysis, it shows abnormally high electric resistance and loses the function of a diaphragm.

The diaphragm of this invention is of the size at least 1 cm in length in at least two directions, the size being suitably selected according to the intended utility. The thickness of the diaphragm is variable according to the intended utility, although a thickness of not greater than 5 cm is generally employed for the diaphragm. No lower limit of the diphragm thickness exists, and the thickness may be reduced within the allowable range of mechanical strength and permeability. Particularly for alkali salt electrolysis, the thinnest possible diaphragm is preferred, so as to lessen the interelectrodes distance, and therefore, normally a 1 cm or less thick diaphragm is conveniently employed. The diaphragm thickness can be suitably selected for intended utility in any individual case.

The manner of making the diaphragm of this invention is not particularly limited, but known methods may be employed. Generally, when inorganic fibers are used as the diaphragm base, the inorganic fibers are dispersed in the fluorine-containing resin dispersion, mixed uniformly, shaped into a film or membrane of desired thickness in accordance with known paper-making technique, and heat-treated to form the diaphragm of desired thickness. Again, when a cloth, paper or woven fabric of inorganic fibers is employed as the diaphragm base, such cloth, paper or woven fabric may be immersed in the fluorine-containing resin dispersion, or such dispersion may be daubed onto such cloth, paper, or woven fabric, and thereafter the impregnated materials are heat-treated to sinter the fluorine-containing resin so as to provide the desired diaphragm. The heat treatment should be effected under conditions satisfactory for sintering the fluorine-containing resin. That is, the heating may be effected at the temperatures ranging from the melting point of the fluorine-containing resin employed to 100° C. higher than the melting point, preferably from the melting point to 50° C. higher than such point, for 1 to 10 minutes, preferably for 3 to 7 minutes. The temperature may be further varied over a wider range, by varying the heating time accordingly.

During the heating, the membrane may be subjected to an elevated pressure, which occasionally favorably affects the properties of the resulting diaphragm, such as mechanical strength, dimensional stability, etc.

The uniform mixing of the diaphragm base containing inorganic fibers with the fluorine-containing resin can be effected with any known mixing means with no limitation, while it is normally advantageous to use the fluorine-containing resin in the form of a dispersion, either immersing the diaphragm base into the dispersion or applying the dispersion onto the base. Such dispersions of fluorine-containing resins have been commercialized under the tradenames of, for example, "Polyflon D-1" (product of Daikin Industries Co., aqueous dispersion of polytetrafluoroethylene), "Neoflon ND-1" (product of the same company, aqueous dispersion of tetrafluoroethylene-hexafluoropropylene copolymer), and "Daiflon D-55P" (product of the same company, dispersion in organic mixed solvent of polychlorotrifluoroethylene). In such mixing procedures, it is advantageous to employ such additional means as addition of a water-soluble solvent such as acetone, alcohol, etc., or coagulant such as an electrolyte, into the dispersion to break the dispersed state of the fluorine-containing resin, or causing coagulation of the resin by heating or violent stirring, etc., to improve the filling efficiency of the resin.

Some of the typical embodiments for making the diaphragm of this invention will be explained hereinafter in fuller detail.

Obviously, diaphragms of substantially equal performance can be prepared from inorganic fiber-containing diaphragm bases and fluorine-containing resinous binders other than those employed in the following embodiments.

When inorganic fibers, for example, asbestos fibers, are used as the diaphragm base, they are first converted to a dispersion phase, using any suitable dispersant or dispersing agent, such as water. Then, to the thoroughly dispersed fibers, a fluorine-containing resin dispersion is added, to be homogeneously blended. In that procedure, asbestos fibers electrostatically adsorb the fluorine-containing resin, but other inorganic fibers in most cases lack such a property. Therefore, the concentration of the fluorine-containing resin dispersion should be predetermined for each individual case, to prevent excessive resin pick-up onto the fibers, depending on the type of diaphragm base employed. The asbestos fibers blended with the resin are subjected to a conventional papermaking process, for example, passed through paper-making machines such as Fourdrinier machine, cylinder paper machine, etc., or treated in accordance with the method specified by JIS, P 8209 (as described in later appearing Example 1). As already mentioned, during the procedure, a water-soluble solvent or coagulant such as an electrolyte may be added to the dispersion, or the dispersion may be violently stirred to cause coagulation of the fluorine-containing resin therein, to improve the filling efficiency of the resin in the diaphragm. Such means is effective not only when inorganic fibers are used as the diaphragm base, but also with other base materials such as paper, fabrics, etc.

The paper-like structure resulting from the papermaking procedure is dried, shaped under optionally elevated pressure, and heated simultaneously, or immediately following the shaping to cause sintering of the fluorine-containing resin. As a result, the diaphragm used in this invention is completed.

Also, when paper, cloth or woven fabric containing inorganic fibers, for example, presently commercially available asbestos paper containing starch paste as the binder, is used as the diaphragm base, the paper is first immersed in water or hot water, so that the binder should be eluted and thereafter the water or hot water is replaced with the dispersion of the fluorine-containing resin, to allow the fine particles of the resin to penetrate into the interfibrous spaces. The optimum result can be obtained in that procedure by immersing the paper into the resin dispersion by hanging the paper vertically suspended by one edge. In this way, not only can the uniform penetration of the resin into the interfibrous spaces be effected, but also such a drawback as difficult handling of fibrous layers disintegrated upon elution of the originally used binder, such as starch, can be minimized.

The paper, cloth or woven fabric thus impregnated with the fluorine-containing resin is dried and thereafter heat-treated, or dried and thereafter shaped into membrane form under elevated pressure, and either simultaneously with, or immediately following the shaping, heat-treated to cause sintering of the resin, to provide the desired diaphragm.

In the diaphragm used in this invention, the fluorine-containing resin presumably serves as the filler of interfibrous spaces, as well as the binder of the inorganic fibers of paper, cloth or woven fabric layers. Accordingly, an excellent porous diaphragm can be prepared without such complex means as conventionally required in the manufacture of a membrane with fine pores from a fluorine-containing resin alone; i.e., advance addition of inflammable or soluble fibers or a fine powder to the resin, and combustion or elution of such additive after shaping, to form fine pores in the membrane.

The diaphragm can be used as it is, or after immersion in alcohol and replacement of the impregnated alcohol with water, in alkali salt electrolysis, or a plating process, as the diaphragm of high mechanical strength, chemical resistance and heat stability. Particularly, when the diaphragm of asbestos paper containing polytetrafluoroethylene as the binder is used in alkali salt electrolysis, the higher the current density, the better are the results obtained, as clearly demonstrated in the later appearing Examples. This property is very unique, compared with conventionally known diaphragms, and brings about immeasurable advantages to the industries, with respect to production rate and cost, in addition to the other advantageous properties such as high mechanical strength and long life.

The diaphragm used in this invention, furthermore, has excellent dimensional stability, which is retained even under high current density. Due to this property, the diaphragm can also be advantageously used in a bipolar-filter press-type electrolytic cell.

In certain cases, plural sheets of the diaphragm may be adhered with each other to form a compound diaphragm, with special advantages in certain fields. For example, excellent results can be obtained by using a compound diaphragm in alkali salt electrolysis, in such a manner that the diaphragm with fluorine-containing resin of high acid resistance should face the anode, and that with a fluorine-containing resin of high alkali resistance, or with other synthetic resin such as polyolefin, should face the cathode.

The present invention and its effect will be hereinafter explained more concretely, with reference to the working examples and controls. It should be understood, however, that the scope of this invention is in no way limited by the descriptions in those examples.

In the examples, the permeability is the value calculated from the volume of liquid flowing through the diaphragm under a fixed hydraulic pressure, in accordance with the equation below:

$$K = \frac{V}{S \cdot H \cdot T} \cdot \frac{ml}{(cm \cdot cm^2 \cdot hr.)}$$

wherein
S = diaphragm space
H = head pressure (cm°H$_2$O)
T = time (hour)
V = volume of liquid flowing out through diaphragm (ml.)
K = permeability

EXAMPLE 1

Six g of white asbestos (No. 6) were immersed in 200 cc of water containing 0.3% of "Solgen 90" (tradename of non-ionic surfactant), and thoroughly dispersed under violent stirring. Then 0.6 cc of "Polflon D-1" (tradename of aqueous dispersion of polytetrafluoroethylene at the concentration of 60 wt. %) which was diluted to ten times with water, was added to the asbestos slurry, under continuous stirring. Approximately ten minutes thereafter, 50 cc of acetone were poured into the system, followed by approximately 10 minutes stirring. The resulting slurry was made into paper in accordance with JIS P8209. (The fiber slurry was thoroughly stirred in a cylindrical vessel with wire gauze attached on the bottom, with perforated plate stirrer. Then the draining cock at the lower part of the vessel was fully opened, and the content was packed under reduced pressure, to form wet paper on the wire gauze. The paper was couched, pressed, and dried). After drying, the paper was pressed under a pressure of approximately 150 kg/cm$^2$, and allowed to stand in a 400° C. electric oven for 10 minutes. Thus, a paper-like membrane of 0.37 mm in average thickness was obtained, which had an average tensile strength of approximately 75 kg/cm$^2$, and permeability to saturated brine of 0.30 ml/hr./cm$^2$/cm.aq. The membrane showed no weight change after more than 50 weeks immersion in anolyte and catholyte for diaphragm electrolysis of sodium chloride, and had a permeability to saturated brine of 0.30 ml/hr./cm$^2$/cm.aq. The properties of diaphragms of varied polytetrafluoroethylene content prepared similarly to the above, except that the polytetrafluoroethylene concentration in "Polyflon D-1" was varied for each run, were measured similarly to the above, with the results as given in Table 1 below.

TABLE 1

| Run No. | Polytetrafluoroethylene Content (wt.%) | Thickness (mm) | Permeability (ml/hr/cm²/cm.aq) | Tensile Strength (kg/cm²) |
|---|---|---|---|---|
| 1 | 1 | 1.0 | 0.32 | 8* |
| 2 | 9 | 0.37 | 0.30 | 75 |
| 3 | 20 | 0.40 | 0.14 | 89 |
| 4 | 30 | 0.39 | 0.04 | 112 |
| 5 | 56 | 0.50 | 0.003 | 102* |

*The tensile strength in this run was measured under wet conditions.

Control 1

The paper-making procedures in Example 1 were repeated, except that no "Polyflon D-1" was used. Thus the paper-like membrane of 0.39 mm in average thickness which was obtained had low mechanical strength, i.e., average tensile strength of approximately 4 kg/cm², and very quickly disintegrated and broke in aqueous liquid.

EXAMPLE 2

1. The paper-making procedures of Example 1 were repeated except that "Polyflon D-1" was replaced by 0.8 cc of "Neoflon ND-1" (tetrafluoroethylene-hexafluoropropylene copolymer in aqueous dispersion, concentration of 50 wt. %) which was diluted to 10 times with water. Thus a paper-like membrane of 0.38 mm in average thickness was obtained, which contained approximately 9 wt. % of the copolymer of tetrafluoroethylene-hexafluoropropylene. The membrane was then heated for 7 minutes at 295° C. The resulting diaphragm had an average tensile strength of 76 kg/cm², and a permeability to saturated brine of 0.30 ml/hr/cm²/cm.aq. By way of testing the chemical resistance of the diaphragm, it was immersed in the anolyte and catholyte for sodium chloride electrolysis, for more than 50 weeks in a manner similar to Example 1. The diaphragm showed no change in weight or permeability, thus demonstrating its excellent performance.

2. Through the procedures similar to the above except that polyvinylidene fluoride was used as the fluorene-containing resin, a 0.45-mm thick diaphragm was obtained. Upon measurements similarly to the above, the diaphragm was confirmed to have a tensile strength of 72 kg/cm², and a permeability of 0.28 ml/cm²/hr/cm.aq.

EXAMPLE 3

A 100-cm² square piece of asbestos paper (product of Asahi Sekimen Co., No. 2,500; thickness=0.5 mm) was hung in hot water with its one end held with a pincher, and boiled to remove the starch binder. Then from both surfaces of the paper, several thin layers were peeled off to control its thickness, and the paper was hung and immersed in approximately 500-ml of "Polyflon D-1" which was controlled to 5° Be (5.7 wt.%). After 5 hours immersion the paper was withdrawn, drained of water, dried in a drying oven, and pressed for 5 minutes under a pressure of approximately 150 kg/cm². Finally the membrane was heated in an electric oven of 400° C. for approximately 10 minutes, so that the polytetrafluoroethylene in the resinous binder was sintered.

The resulting paper-like membrane contained approximately 31 wt. % of polytetrafluoroethylene, had an average thickness of 0.36 mm, average tensile strength of 53 kg/cm², and a permeability to saturated brine of 0.03 ml/hr/cm²/cm.aq.

EXAMPLE 4

The paper-like membrane obtained in Example 3 was immersed in methanol for 10 minutes, and the impregnated alcohol was exchanged with water. The resulting membrane was used in the diaphragm process for sodium chloride electrolysis under the conditions shown in Table 2 below, with the results given in the same table.

TABLE 2

| Conditions | | |
|---|---|---|
| | Brine Composition | NaCl: 316 g/l<br>Na₂CO₃: 0.5 g/l<br>Ca+Mg: No more than 10 ppm |
| | pH of brine | 3.50 |
| | Electrolytic cell | Filter press type electrolytic cell with metallic electrode (Ir) |
| | Current density | 30 A/dm² (cell voltage: 4.5V) |
| Results | | |
| | Catholyte Composition | NaOH: 145 g/l<br>NaClO₃: 0.2 g/l<br>Na₂CO₃: trace<br>NaCl: 183 g/l |
| | Current Efficiency on Cathode Base | 96% |
| | Liquid Temp. | Anolyte: 91° C.<br>Catholyte: 95° C. |

This diaphragm has been used now for more than one year continuously, with no trouble whatsoever. When the current density was varied as in Table 3, the resulting NaOH concentration and current efficiency were as also given in the same table. As clearly demonstrated by the results, better electrolysis performance was obtained under higher current density.

TABLE 3

| Run No. | Current Density (A/dm²) | NaOH Concentration (g/l) | Current Efficiency (%) |
|---|---|---|---|
| 1 | 10 | 110 | 82 |
| 2 | 15 | 139 | 94 |
| 3 | 20 | 145 | 96 |

Control 2

The electrolysis of Example 4 was effected similarly, except that the conventional asbestos paper ("Neoplene" binder) was used as the diaphragm. Satisfactory results were obtained at low current density (around 10 A/dm²), but the diaphragm was damaged after approximately 8 hours use, and could no longer be used. When the current density was raised to 20–30 A/dm², the diaphragm was damaged within a very short time.

EXAMPLE 5

The same asbestos paper as employed in Example 3 was immersed in aqueous dispersion containing 9.3 wt. % of "Polyflon D-1," drained of water, dried, and pressed under a pressure of 100 kg/cm², to be formed into a paper-like membrane of 0.41 mm in average thickness. The membrane was then heated for 5 minutes at 335° C., so that the polytetrafluoroethylene used as the binder was sintered.

The resulting diaphragm containing approximately 32 wt. % of polytetrafluoroethylene and had an average tensile strength of 56 kg/cm² and a permeability to saturated brine of 0.026 ml/hr/cm²/cm.aq. The voltage fall due to the diaphragm during electrolysis of sodium chloride was approximately 0.1 V at 14 A/dm$^2$.

When the diaphragm was used as the separator in the electrolysis apparatus, it showed quite satisfactory corrosion resistance and mechanical strength, and was very advantageous in that it had very low electric resistance such as 0.85$\Omega$/cm$^2$, in spite of its low permeability.

EXAMPLE 6

A paper-like membrane of 0.40 mm in average thickness was prepared similarly to Example 3, except that blue asbestos paper (hand-laid) was used as the diaphragm base. The membrane contained approximately 10 wt.% of polytetrafluoroethylene, and had an average tensile strength of 61 kg/cm$^2$, and a permeability to saturated brine of 0.26 ml/hr/cm$^2$/cm.aq.

When the membrane was used as the diaphragm during chromium plating, it showed excellent corrosion resistance and mechanical strength, as well as very low electric resistance such as 0.7$\Omega$/cm$^2$.

EXAMPLE 7

The asbestos paper from which the starch binder had been removed similarly to Example 3 was peeled to half its original thickness. The resulting halves were washed with methanol, so that the water contained in the asbestos fiber bundles were replaced by methanol. Then one of them was immersed in "Daiflon Dispersion D-55 P" (tradename, dispersion of polychlorotrifluoroethylene in organic mixed solvent; concentration=55 wt.%) which was diluted with methanol. After 5 minutes immersion the membrane was withdrawn, drained of water, dried, and pressed under a pressure of approximately 150 kg/cm$^2$ for 5 minutes. Thereafter it was heated in an electric oven of 230° C. for approximately 10 minutes, to make it suitable for practical use as a diaphragm.

Also, the other half of the membrane was immersed in methanol-diluted DALBOM-TM (liquid dispersion of polyvinyl fluoride in organic solvent; concentration=30 wt.%), drained of solvent, superposed with the above Daiflon-treated membrane, together dry-pressed and heated in an electric oven of 260° C. for approximately 10 minutes. Thus a compound diaphragm of 0.42 mm in average thickness was obtained, which had an average tensile strength of 49 kg/cm$^2$, and a permeability to saturated brine of 0.034 ml/hr/cm$^2$/cm.aq. In the diaphragm, the liquid polyvinyl fluoride-treated side had strong resistance to alkali, and the polychlorotrifluoroethylene-treated side showed high chlorine resistance. Thus, the diaphragm as a whole was highly useful for electrolysis.

EXAMPLE 8

A sheet of paper-like membrane was prepared through the procedures similar to Example 2, using 250 g of white asbestos and 75 cc of "Neoflon ND-1" (tradename, copolymer of tetrafluoroethylene-hexafluoropropylene). The membrane contained 17 wt.% of the ethylene tetrafluoride-propylene hexafluoride copolymer.

Upon heating the membrane for 8 minutes at 295° C. a diaphragm of 0.85 mm in average thickness, having a permeability to saturated brine of 0.11 ml/hr/cm$^2$/cm.aq, and a tensile strength of 86 kg/cm$^2$, was obtained.

This diaphragm was mounted in a large size bipolar-filter press type electrolytic cell (electrode area: 500 mm × 500 mm), and used in sodium chloride electrolysis similarly to Example 4. The NaOH concentration at initiation of the electrolysis was 10.7 wt.%, and the current efficiency was 95%. On the 274th day of continuous operation, the NaOH concentration was 10.6 wt.%, and the current efficiency was maintained on the same level of 95%, under the cell voltage of 3.9 volts. These results clearly demonstrate that in the process of the present invention the diaphragm as described allows very stable operation over an extensive period.

EXAMPLE 9

Wet tensile strengths of the diaphragms of Table 4 which were prepared similarly to Example 8 were measured and compared with that of commercial diaphragm, with the results also given in Table 4. It is apparent from the data that the diaphragms used in the subject process exhibit excellent mechanical strength under wet conditions, which is one of the essential requirements in practical use.

TABLE 4

| Run No. | Type and Content of Binder | | Tensile Strength (kg/cm$^2$) |
|---|---|---|---|
| | Type | Binder Pick-up (wt.%) | |
| 1 | *Fluorine resin | 30 | 78 |
| 2 | *Fluorine resin | 17 | 57 |
| 3 | Starch | — | 3 |

*tetrafluoroethylene-hexafluoropropylene copolymer

When the diaphragms of Run Nos. 1 and 2 were used in sodium chloride electrolysis similarly to Example 8 for one year continuously, they had the tensile strength of, respectively, 61 kg/cm$^2$ and 50 kg/cm$^2$. From these results, it is apparent that the strength of the diaphragm used in this invention is extremely high, also under wet conditions.

EXAMPLE 10

Through the procedures similar to Example 8, a 0.82-mm thick diaphragm containing 30 wt.% of ethylene tetrafluoroethylene-hexafluoropropylene copolymer and having a permeability of 0.03 ml/cm$^2$/hr/cm.aq was prepared, which was placed between the anode, cathode, and the material to be plated, in a NiSO$_4$—NiCl$_2$—H$_3$BO$_3$—H$_2$O bath for nickel plating, at 70° C. and 5 A/dm$^2$. The cell voltage during the operation was as shown in Table 5, while that during copper plating at 35° C. and 2 A/dm$^2$ in CuCN-NACN-H$_2$O bath is shown in Table 6 below. In both cases, no voltage rise was observed during one year continuous operation, and the plating finish was excellent. After one Year use, the diaphragm used in nickel plating showed slight decrease in strength, but that used in the copper plating showed no change. The initial voltage value was identical with that in the case of applying conventional Nylon and Saran diaphragm to the same plating baths, while the diaphragm of the invention showed the life 2-3 times longer than that of the conventional products.

TABLE 5

| Days | Cell Voltage (V) |
|---|---|
| 0 | 7.2 |
| 100 | 7.3 |
| 200 | 7.3 |
| 300 | 7.3 |

TABLE 6

| Days | Cell Voltage (V) |
|---|---|
| 0 | 3.0 |

TABLE 6-continued

| Days | Cell Voltage (V) |
|---|---|
| 100 | 3.0 |
| 200 | 3.0 |
| 300 | 3.0 |

EXAMPLE 11

Through the procedures similar to Example 1 a diaphragm containing 56 wt. % of polytetrafluoroethylene was prepared. The diaphragm had a tensile strength of 102 kg/cm², thickness of 0.5 mm, permeability of 0.003 ml/cm²/hr/cm.aq, and an electric resistance of 1Ω/cm², after immersion in 20% KOH solution. The diaphragm was used as the spacers of a lead battery and alkali battery with very satisfactory results, i.e., they exhibited better dimensional stability and longer life than those of conventional spacers made of ebonite and vinyl chloride resin.

EXAMPLE 12

Through the procedures similar to Example 1 a diaphragm containing 1 wt.% of polytetrafluoroethylene was manufactured. The diaphragm had a tensile strength of 8 kg/cm², thickness of 1.0 mm, permeability of 0.32 ml/cm²/hr/cm.aq, and an electric resistance of 0.6Ω/cm, after immersion in saturated brine. When the diaphragm was used in a tank-type electrolytic cell of brine by diaphragm process, it withstood the satisfactory ue of 10 days, while a conventional diaphragm was completely disintegrated on about the third day. Because the disintegration of the diaphragm of this invention was very slow, the initial operational stability was excellent. Also the workability at the mounting operation of the diaphragm was approximately ten times better than that of the diaphragm containing no polytetrafluoroethylene.

EXAMPLE 13

A 0.41-mm thick diaphragm was prepared in the manner similar to Example 2, except that the white asbestos was replaced by glass fibers (average diameter: 6μ, average length: 20 mm). The diaphragm contained approximately 9 wt.% of polytetrafluoroethylene, and had a tensile strength of 42 kg/cm², and a permeability of 0.31 ml/cm²/hr/cm.aq.

The diaphragm was used in nickel-plating with a Watts bath similarly to Example 1. After 5 months continuous use, no voltage rise was observed, and equally satisfactory nickel plating was obtained. Substantially equivalent results were obtained when rock wool was employed as the binder in place of the glass fibers.

EXAMPLE 14

A 0.42 mm thick diaphragm was prepared similarly to Example 13, except that the glass fibers were replaced by graphite fibers (wool-like configuration, true specific gravity: 1.98). The diaphragm contained approximately 9 wt. % of polytetrafluoroethylene, and had a tensile strength of 37 kg/cm², and a permeability of 0.29 ml/cm²/hr/cm.aq.

Also, the diaphragm prepared by impregnating a felt of graphite fibers (bulk density: 0.24) with a dispersion of a tetrafluoroethylene-hexafluoropropylene copolymer, and heat-treating the felt under pressing similarly to Example 3, had a thickness of 1 mm, tensile strength of 55 kg/cm², and a permeability of 0.21 ml/cm²/hr/cm.aq.

Both diaphragms were useful in plating baths.

EXAMPLE 15

"Polyflon Primer E-1,100" (tradename of polytetrafluoroethylene coating primer) was sprayed onto wool-like stainless steel filaments, and dried with an infrared lamp. The filaments were then heat-treated in an electric oven at 400° C. for 10 minutes, and pressed to approximately 3 mm thick plate. The plate was immersed in 10-times diluted "Neoflon Dispersion ND-1", drained of water, dried, pressed to a thickness of approximately 1 mm, and heat-treated at 300° C. to form a diaphragm. The product had a permeability of 0.07 ml/cm²/hr/cm.aq, and a tensile strength of 150 kg/cm². The strength showed no deterioration under wet conditions. The diaphragm was useful when mounted on a filter press-type electrolytic cell.

What is claimed is:

1. In an electrolysis process for brine wherein a diaphragm is utilized in an electrolytic cell, the improvement wherein said diphragm is of a size of at least 1 cm in length in at least two directions, said diaphragm having permeability to water of 0.003 − 0.32 ml/cm²/hr/cm.H₂O and comprising a diaphragm base composed of inorganic fibers selected from the group consisting of asbestos and graphite fibers and a fluorine-containing resin, said fluorine-containing resin being present in an amount of 0.5 − 60% by weight based on the weight of said diaphragm, and said diaphragm being prepared by homogeneously blending a dispersion of said inorganic fibers with said fluorine-containing resin, forming said blend into a film, and then heat treating said film so that said resin is locally sintered and adhered to the film.

2. The process of claim 1 wherein said fluorine-containing resin is at least one member of the group consisting of polytetrafluoroethylene, poly(tetrafluoroethylene-hexafluoropropylene), polychlorotrifluoroethylene, polyvinylidene fluoride and polyvinyl fluoride.

3. The process of claim 1 wherein said fluorine-containing resin is present in an amount of 5 − 50% by weight based on the weight of said diaphragm.

* * * * *